United States Patent [19]

Luick

[11] 4,277,937
[45] Jul. 14, 1981

[54] CONVERTIBLE ROTARY MOWER-VACUUM SWEEPER

[76] Inventor: Woodrow W. Luick, 602 E. Van Buren, Apt. 4, Harlingen, Tex. 78550

[21] Appl. No.: 66,225

[22] Filed: Aug. 13, 1979

[51] Int. Cl.³ .................... A01D 35/12; A01D 55/18
[52] U.S. Cl. .................................. 56/17.5; 56/17.4; 56/255
[58] Field of Search .................. 56/17.4, 17.5, 255, 56/295, 320.1; 15/328; 37/43 L

[56] References Cited

U.S. PATENT DOCUMENTS

| | | | |
|---|---|---|---|
| 2,687,607 | 8/1954 | Sewell | 56/17.4 |
| 3,093,948 | 6/1963 | Root | 56/255 |
| 3,531,923 | 10/1970 | DeLay | 56/255 |
| 3,759,023 | 9/1973 | Comer | 56/17.4 |
| 3,869,766 | 3/1975 | Raymond | 24/217 |
| 3,959,954 | 6/1976 | Halsten | 56/255 |
| 3,995,348 | 12/1976 | Chernosky | 37/43 |

Primary Examiner—Robert A. Hafer
Attorney, Agent, or Firm—G. Turner Moller

[57] ABSTRACT

There is disclosed a technique for modifying a conventional rotary lawn mower to provide the capability of cleaning a paved area such as a sidewalk or driveway. Basically, the only modification to the lawn mower is the provision of a depending skirt extending downwardly from a peripherial wall of the lawn mower frame. Three embodiments are illustrated. The first embodiment comprises a skirt mounted on the lawn mower frame for adjusting movement between an upper or grass cutting position and a lower or sweeping position in which the lower edge of the skirt is spaced only slightly above the bottoms of the lawn mower wheels. The second embodiment comprises a skirt fixed to the lawn mower frame. Adjustment of the skirt to a lower sweeping position is accomplished by the provision of conventional adjustable wheels which effectively lower the lawn mower frame relative to the ground. The third embodiment comprises a skirt which is attached to the lawn mower only when it is desired to perform a sweeping function.

6 Claims, 6 Drawing Figures

CONVERTIBLE ROTARY MOWER-VACUUM SWEEPER

This invention relates to rotary lawn mowers and particularly to a rotary lawn mower which can be modified to perform a cleaning or sweeping function for use on paved areas.

It is well known to those who do yard work that the clean-up of paved areas, such as driveways, sidewalks and the like, following the actual mowing and trimming operation can be quite lengthy and require a significant proportion of the total time involved in this task. Although specialized vacuum cleaning equipment is available for such a chore, it will be appreciated that this equipment is relatively expensive and is not a viable economic trade off for home owners with small yards.

It is accordingly not surprising that attempts have been made in the prior art to modify conventional rotary lawn mowers into cleaning implements. The basic approach or the prior art has been to attach a plate to the bottom of the lawn mower which provides a restricted opening therein. Typical devices of this type are found in U.S. Pat. Nos. 3,286,376; 3,918,119 and 3,995,348. There are, of course, evident disadvantages to this approach. First, none of these devices can be operated as a lawn mower with the baffle attached. Consequently, the lawn mower must be turned at least on its side in order to attach the baffle which is, of course, beyond the physical capabilities of many individuals. In addition, quite a mess can be created by grime on the mower as well as spillage of gasoline. Second, the baffle is necessarily quite large which creates a storage problem.

Another disclosure of substantial interest is found in U.S. Pat. No. 3,400,523. In this device, the lawn mower housing comprises a top panel having an air inlet opening. A blower wheel, separate from the cutting blade, is affixed to the motor shaft and acts to draw air through the inlet opening to pressurize the interior of the lawn mower housing. Pressurizing the lawn mower housing causes the frame to rise relative to the ground with the pressurized air exhausting through the discharge opening into an air permeable bag. In a wheeled embodiment of the invention, a flexible rubber skirt depends from the lawn mower housing to restrict the exit of air underneath the periphery of the mower housing. In this fashion, the majority of air drawn through the inlet opening moves through the discharge passage thereby improving the collection of grass cuttings in the air permeable bag.

A futher disclosure of interest is found in U.S. Pat. No. 3,029,533. This device comprises a rotary lawn mower which has been modified to act as a snow blowing device. Several modifications have been made. First, the ordinary rubber wheels on the front of the mower are replaced with disc type wheels to break up snow over which the device moves. Second, the grass cutting blade is removed and replaced by a snow blowing flinger. Third, a depending skirt is positioned on the bottom of the lawn mower housing. The exact mode of operation of the depending skirt is not clear.

Other disclosures of more general interest are found in U.S. Pat. Nos. 2,993,321; 3,043,036; 3,423,918 and 3,759,023.

In summary, this invention comprises a more-or-less conventional rotary lawn mower including a frame having an imperforate top panel and a depending imperforate peripheral wall providing a grass discharge passage therein and including a grass cutting chamber having a downwardly facing opening defined by the walls. A plurality of wheels on the frame rollably support the frame on an underlying surface with the points of contact of the wheels and the underlying surface generally defining a plane. A motor, which may be either of the internal combustion or electrical type, is mounted on the top panel and includes a drive shaft extending therethrough into the chamber. A grass cutting blade is affixed adjacent the center thereof to the shaft and includes a grass cutting edge rotated by the shaft in cutting relation to grass over which the frame moves. The blade is configured to provide an air moving function for forcing air through the discharge passage and for drawing air inwardly under the peripheral wall.

In accordance with this invention, means are provided for creating an area of substantial air velocity directed inwardly underneath the peripheral wall throughout substantially the length thereof for lifting debris off the underlying surface. This includes a skirt substantially the length of the peripheral wall providing a lower edge and means dependingly mounting the skirt on the frame in generally coaxial relation to the peripheral wall positioning the lower edge slightly above the plane of the wheel contact points for drawing air inwardly into the chamber under the lower skirt edge upon operation of the motor. In this fashion, a conventional rotary lawn mower can be modified to provide a sweeping or cleaning function in a simple and expeditious manner without substantially obstructing the downwardly facing chamber opening defined by the peripheral wall.

It is an object of this invention to provide a rotary lawn mower and improved means for converting the lawn mower into a vacuum cleaner or sweeper for use on paved areas.

Other objects and advantages of this invention will become more fully apparent as this description proceeds, reference being made to the accompanying drawings and appended claims.

IN THE DRAWINGS

Figure 1:
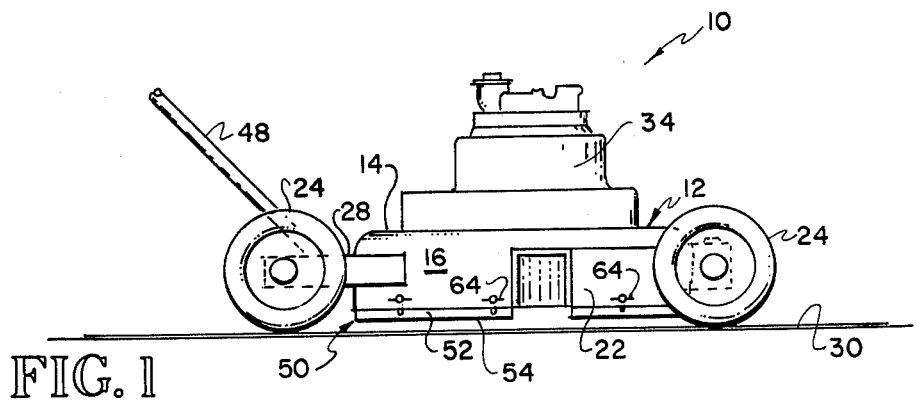
FIG. 1 is a side elevational view of one embodiment of the invention.
Figure 2:
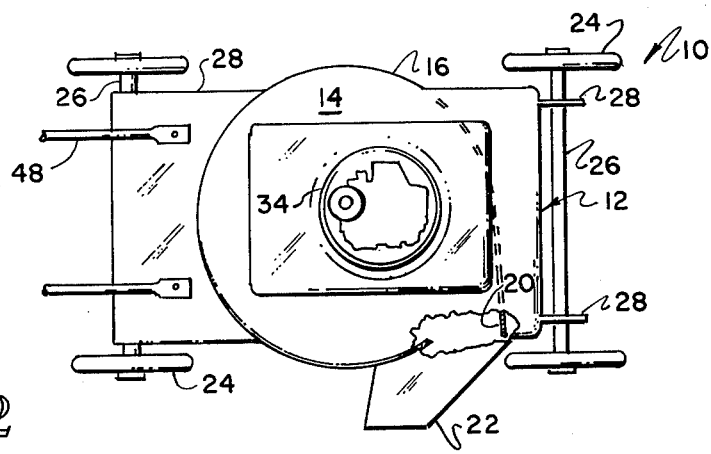
FIG. 2 is a top elevational view of the embodiment of FIG. 1, certain parts being broken away for purposes of illustration.

Referring to FIGS. 1-4, there is illustrated a convertible lawn mower-vacuum cleaner 10 constructed in accordance with the principles of this invention. The convertible device 10 comprises a housing 12 having an imperforate top panel 14 and a depending peripheral wall 16 defining a grass cutting chamber 18. The peripheral wall 16 provides a discharge passage 20 therein communicating with a discharge chute 22 in a conventional manner. The grass cutting chamber 18 provides a downwardly facing opening defined by the peripheral wall 16.

Supported by the housing or frame 12 are at least three and preferably four ground engaging wheels 24. Conveniently, the wheels 24 are supported on axles 26 received in brackets 28. It will be evident that the points of contact of the wheels 28 and the underlying ground surface 30 substantially define a plane which is parallel to a downwardly facing edge 32 of the peripheral wall 16.

Mounted on the top panel 14 is a motor 34, which may be either of the internal combustion or electrical type. The motor 34 comprises a drive output or shaft 36 extending through an opening 38 in the top panel 14 into the grass cutting chamber 18. The opening 38 is substantially closed by the motor 34 and/or the drive shaft 36 to avoid air entrance into the cutting chamber 18 through the opening 38.

A grass cutting blade 40 is disposed in the chamber 18 and is affixed adjacent the center thereof to the shaft 36 in any suitable fashion, as by a suitable connector 42. The blade 40 provides a grass cutting edge 44 which is rotated by the shaft 36 in cutting relation to grass over which the mower 10 moves. The blade 40 includes upwardly turned end sections 46 which operate as a fan for drawing air under the lower edge 32 and forcing air out of the discharge chute 22 in a conventional manner. The fan function of the blade 40 has several conventional features. First, the updraft inside the chamber 18 causes grass blades to stand substantially vertically so the cutting edge 44 has the opportunity to sever them. Second, the air draft inside the chamber 18 is sufficient to discharge cut grass particles and the like through the discharge chute 22 either laterally of the lawn mower 10 or into a conventional bag supported adjacent the discharge chute 22.

Also provided by the convertible device 10 is a handle 48 of any suitable type. As will be recognized by those skilled in the art, the preceding description of the device 10 basically describes a more-or-less rotary lawn mower.

In accordance with this invention, means 50 are provided for creating an area of substantial air velocity directed inwardly of the peripheral wall 16 throughout substantially the length thereof for lifting debris off the underlying ground or paved surface 30. In essence, the means 50 acts to increase air velocity below the lower edge 32 of the peripheral wall 16 thereby getting any debris on the surface 30 airborne inside the chamber 18. Once the debris is airborne inside the chamber 18, it passes through the discharge passage 20 and chute 22 either laterally of the convertible device 10 or into a conventional bag (not shown).

The means 50 comprises an elongate skirt 52 extending along substantially the length of the peripheral wall 16, terminating on opposite sides of the discharge passage 20 and providing a lower edge 54 closely adjacent the surface 30. Experimentation to date indicates that the gap between the lower edge 54 and the surface 30 should be less than ⅜ inches and is preferably on the order of about ⅛ inches. Although the skirt 52 may be of a rigid material, such as sheet metal or the like, it is preferred that the skirt 52 be of a flexible material such as rubber or thin plastic in order to pass over twigs, pebbles and the like, which may be slightly larger than the gap between the lower skirt edge 54 and the surface 30. The means 50 also includes connecting means 56 for securing the skirt 52 on the housing 12 in a depending fashion.

One of the important features of the means 50 is adjustability from a normal or upper cutting position to a cleaning or lower position. In the embodiment of FIGS. 1–4, this feature is afforded by the connecting means 56 which comprises a bolt 58 extending through an elongate vertical slot 60 in the skirt 52 and an opening 62 adjacent the bottom of the peripheral wall 16. The bolt 58 receives a nut 64 which is conveniently of the wing variety to allow rapid and expeditious tightening and loosening of the connecting means 56.

When using the device 10 as a lawn mower, the skirt 52 is elevated relative to the wall 16 so that the bolt 58 resides adjacent the lower end of the vertical slot 60. With all of the connecting means 56 securely tightened, the lower skirt edge 54 is substantially coplanar with the lower edge 32 of the peripheral wall 16. Accordingly, the device 10 functions as a lawn mower in its normal customary mode of operation.

Figure 3:
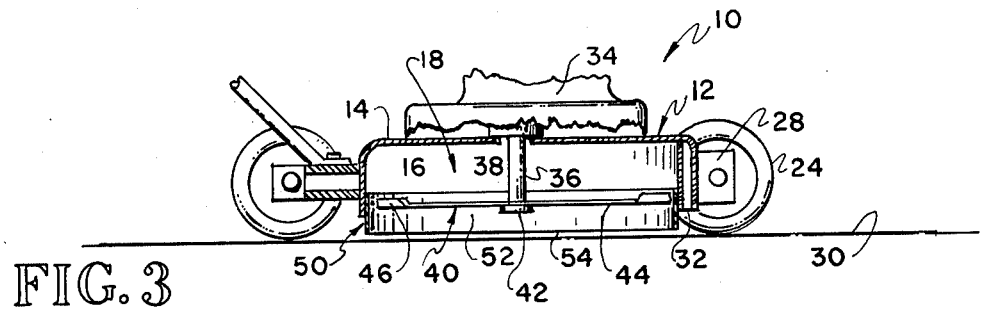
FIG. 3 is a broken side elevational view of the embodiment of FIGS. 1 and 2.
Figure 4:
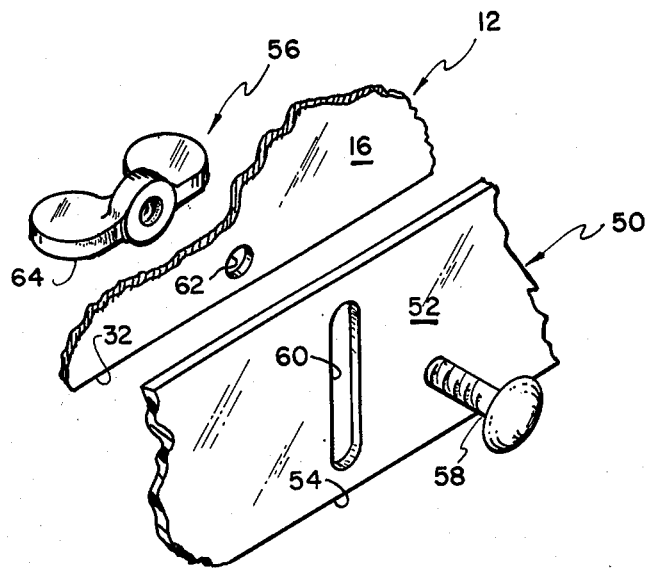
FIG. 4 is an enlarged partial exploded view of the depending skirt of FIGS. 1-3 as viewed from the interior of the mower housing.

When the actual mowing or trimming operation is completed and it is desired to use the device 10 as a vacuum cleaner or sweeper, the wing nuts 64 are loosened to allow the skirt 52 to drop relative to the peripheral wall 16 to position the bolt 58 adjacent the upper end of the vertical slot 60 as suggested in FIGS. 1, 3 and 4. The wing nuts 64 are then tightened to secure the skirt 52 in position. The lower edge 54 is thereby placed closely adjacent the ground surface 30 or the plane defined by the points of contact of the wheels 24 with the surface 30. Since the total amount of air moved by the blade 40 remains substantially the same and the gap between the bottom of the housing 12 and the underlying surface 30 has been dramatically reduced by the skirt 52, it will be seen that the velocity of air passing underneath the housing 12 and specifically underneath the skirt 52 dramatically increases. If the skirt 52 is positioned relatively close to the ground or paved surface 30, the air velocity is sufficient to get debris, such as grass cuttings and the like, airborne inside the housing 12. Once airborne, the debris is either thrown laterally of the device 10 or it is thrown into a conventional bag.

So long as there is sufficient clearance inside the housing 12 for the skirt 52 and bolt 58, the skirt 52 may be placed on the inside of the peripheral wall of most commercially available rotary lawn mowers. The housing 12 of some commercially available rotary lawn mowers is substantially cylindrical so that a skirt may be placed on the outside of the peripheral wall 16. This alternative is illustrated in FIGS. 5 and 6 although the skirt of these embodiments may also be placed on the inside of their associated peripheral wall if desired.

Figure 5:
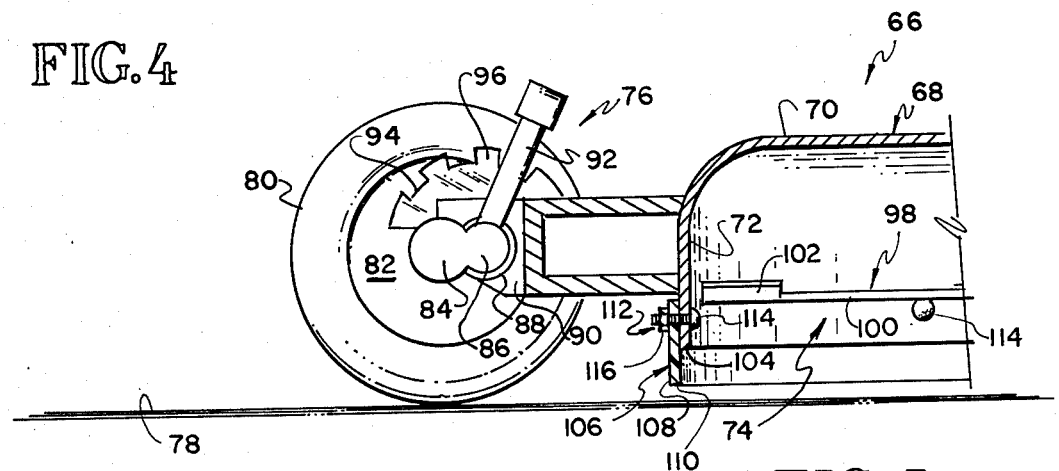
FIG. 5 is a partial broken side elevational view of another embodiment of the invention.
Figure 6:
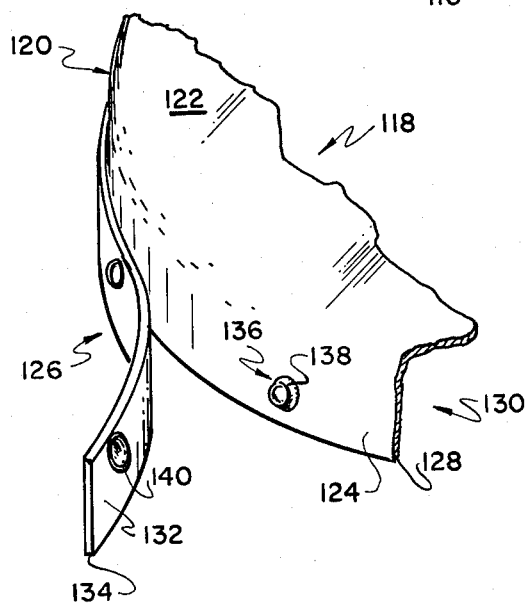
FIG. 6 is an enlarged partial isometric view of another embodiment of the invention.

Referring to FIG. 5, there is illustrated another convertible lawn mower-vacuum cleaner 66 constituting another embodiment of this invention. The convertible device 66 comprises a housing 68 comprising an imperforate top panel 70 and a depending peripheral wall 72 defining a grass cutting chamber 74. The peripheral wall 72 provides a discharge passage (not shown) communicating with a discharge chute (not shown) in a conventional manner. The grass cutting chamber 74 provides a downwardly facing opening defined by the peripheral wall 72.

Supported by the housing or frame 68 are at least three and preferably four ground engaging wheels 76. As will be more fully apparent hereinafter, the ground engaging wheels 76 adjustably support the housing 68 relative to an underlying surface 78 to allow relative raising and lowering of the housing 68.

Although the adjustability of the wheels 76 may be accomplished in any suitable manner, the wheels 76 are illustrated as comprising a tire 80, a hub 82 having an axle 84 journaled therein and connected to bell crank type lever 86 which is journaled in a bearing 88 carried by an extension 90 of the frame 68. A resilient handle 92 having a tang (not shown) thereon is affixed to the bell crank lever 86 and is selectively positionable in one of a plurality of notches 94 in a bracket 96 affixed to the extension 90 adjacent the bell crank 86. Raising or lowering of the housing 68 is accomplished in a conventional manner by moving the handle 92 away from the bracket 96 to disengage the tang (not shown) thereon out of one of the notches 94, rotating the handle 92 to position the tang (not shown) adjacent another of the notches 94 and then releasing the handle 92 to allow the tang (not shown) to enter another of the notches 94.

Mounted on the top panel 70 is a motor (not shown) which comprises a drive output or shaft (not shown) extending through the top panel 70 into the grass cutting chamber 74. The opening (not shown) through which the drive shaft (not shown) extends is substantially closed by the motor and/or the drive shaft to avoid air entrance into the cutting chamber 74 through the opening.

A grass cutting blade 98 is disposed in the chamber 74 and is affixed adjacent the center thereof to the drive shaft (not shown) in any suitable fashion. The blade 98 provides a grass cutting edge 100 which is rotated by the shaft in cutting relation to grass over which the mower 66 moves. The blade 98 includes upperwardly turned end sections 102 which operate as a fan for drawing air under the lower edge 104 of the peripheral wall 72 and forcing air out of the discharge chute (not shown) in a conventional manner.

In accordance with this invention, means 106 are provided for creating an area of substantial air velocity directed inwardly of the peripheral wall 72 throughout substantially the length thereof for lifting debris off the underlying ground or paved surface 78. In essence, the means 106 acts to increase air velocity below the lower edge 104 thereby getting any debris on the surface 78 airborne inside the chamber 74. Once the debris is airborne inside the chamber 74, it passes through the discharge chute (not shown) either laterally of the convertible device 66 or into a conventional bag.

The means 106 comprises an elongate skirt 108 extending along substantially the length of the peripheral wall 72 and providing a lower edge 110 closely adjacent the surface 78. As mentioned previously, it is preferred that the gap between the lower edge 110 and the surface 78 be less than $\frac{3}{8}$ inches and is preferably on the order of about $\frac{1}{8}$ inches. Although the skirt 108 may be made of any rigid material, such as sheet metal or the like, it is preferred that the skirt 108 be of a flexible material such as rubber or thin plastic in order to pass over twigs, pebbles and the like which may be slightly larger than the gap between the lower skirt edge 110 and the surface 78. The means 50 also include connecting means 112 for securing the skirt 108 on the housing 68 in a depending fashion.

In the embodiment of FIG. 5, the skirt 108 is affixed to the peripheral walls 76 in a non-adjustable fashion. Accordingly, the connecting means 112 may comprise a plurality of bolts 114 extending through suitable openings spaced adjacent the lower edge 104 of the peripheral wall 72 and a like plurality of nuts 116 on the exterior of the housing 68 to captivate the skirt 108 therebetween.

When using the device 66 as a lawn mower, the handle 92 is placed in any one of the notches 94 except for the notch 94 providing for the lowermost positioning of the frame 68. In this regard, it may be desirable to modify the adjustable wheels 76 to provide an additional notch 94 allowing an additional increment of adjustment of the frame 68 toward the underlying surface 78.

When the actual mowing or trimming operation is completed and it is desired to used the device 66 as a vacuum cleaner or sweeper, the wheels 76 are adjusted to position the lower skirt edge 110 closely adjacent the underlying surface 78. Since the total amount of air moved by the blade 98 remains substantially the same and the gap between the bottom of the housing 68 and the underlying surface 78 has been dramatically reduced by the skirt 108, it will be seen that the velocity of air passing underneath the housing 68 and specifically underneath the skirt 108 dramatically increases. If the skirt 108 is positioned relatively close to the ground or paved surface 78, the air velocity is sufficient to get debris airborne inside the housing 68. Once airborne, the debris is either thrown laterally of the device 66 or is thrown into a conventional bag.

Referring to FIG. 6, there is illustrated a partial view of another convertible lawn mower-vacuum cleaner 118 constructed in accordance with the principles of this invention. The convertible device 118 comprises a more-or-less conventional rotary lawn mower comprising a housing 120 having an imperforate top wall 122 and a depending peripheral wall 124. In accordance with this invention, means 126 are provided for creating an area of substantial air velocity directed inwardly of the peripheral wall 124 throughout substantially the length thereof for lifting debris off the underlying ground or paved surface. In essence, the means 126 acts to increase air velocity below the lower edge 128 of the peripheral wall 124 thereby getting any debris on the underlying surface airborne inside a cutting chamber 130 beneath the frame 120.

The means 126 comprises an elongate skirt 132 extending along substantially the length of the peripheral wall 124 and providing a lower edge 134 closely adjacent the underlying surface.

The means 126 includes means 136 for releasably connecting the skirt 132 to the depending wall 124. Although the releasable connecting means 136 may be of any suitable type, it is illustrated as comprising a plurality of snap type fasteners including a plurality of male connectors 138 affixed to the exterior of the peripheral wall 124 and a plurality of female connectors 140 carried by the strip 132.

When using the convertible device 118 as a lawn mower, the skirt 132 is removed. Accordingly, the device 118 functions as a lawn mower in its normal customary mode of operation.

When the actual mowing or trimming operation is completed and it is desired to use the device 118 as a vacuum cleaner or sweeper, the skirt 132 is fastened to the peripheral wall 124 by the snap fasteners 138, 140 to position the lower skirt edge 134 substantially below the lower edge 128 of the peripheral wall 124. The lower edge 134 is thereby placed closely adjacent the underlying ground surface. Accordingly, the velocity of air passing underneath the skirt 132 is sufficient to lift debris off of the underlying ground surface. Once air borne, the debris is either thrown laterally of the device 118 or is thrown into a conventional bag.

It has been notice that devices built in accordance with this invention are most effective in lifting debris off of the paved surface in a small generally circular band corresponding to the area immediately below the skirt attached to the lawn mower frame or housing. This is noticed when the device is positioned on a paved surface to be cleaned and the motor is started. If the motor is run for a few moments without moving the lawn mower and then turned off, what will be seen is an annular band of relatively clean pavement roughly corresponding to the trace of the skirt. This, of course, illustrates the effectiveness of the skirt of this invention. Movement of the converted lawn mower of this invention across the paved surface moves the annular effective cleaning area to lift debris off of the entire paved surface.

It will accordingly be seen that this invention operates due to restriction of the gap between the bottom of the peripheral wall and the underlying ground surface as opposed to restricting the size of the downwardly facing opening defined by the peripheral wall 72. Accordingly, even with the skirt inside the peripheral wall, the downwardly facing opening is substantially unobstructed.

Although the invention has been described in its preferred form with a certain degree of particularlity, it is understood that the present disclosure of these preferred forms in only by way of example and that numerous changes in the details of construction and the combination and arrangement of parts may be resorted to without departing from the spirit and scope of the invention as hereinafter claimed.

I claim:

1. A rotary lawn mower/vacuum sweeper, comprising
    a frame having an imperforate top panel and a depending peripheral wall providing a grass discharge passage therein and providing a grass cutting chamber having a downwardly facing opening defined by the wall;
    at least three wheels on the frame for rollably supporting the frame on an underlying surface, the points of contact of the wheels and the underlying surface generally defining a plane;
    a motor mounted on the top panel and including a drive shaft extending into the chamber;
    a grass cutting blade, in the chamber, affixed adjacent the center thereof to the shaft and including a grass cutting edge rotated by the shaft in cutting relation to grass over which the frame moves, the blade being configured as a fan for forcing air through the discharge passage and for drawing air inwardly under the underside of the peripheral wall and residing above the bottom of the peripheral wall and
    means for creating an area of substantial air velocity directed inwardly of the peripheral wall throughout substantially the length thereof, effective for lifting debris off the underlying surface in a generally annular band corresponding to the location of the peripheral wall, including
    a skirt substantially the length of the peripheral wall, providing a lower edge and an imperforate portion above the lower edge and
    means dependingly mounting the skirt on the frame in generally coaxial relation to the peripheral wall positioning the imperforate portion below the lower edge and spacing the lower edge from the plane but less than about ⅜" thereabove for drawing air inwardly into the chamber under the lower skirt edge upon operation of the motor;
    any obstruction of the chamber opening by the creating means providing an insignificant increase in air velocity under the lower skirt edge.

2. The mower of claim 1 wherein the skirt is bodily flexible.

3. The mower of claim 1 wherein the mounting means comprises means for effecting adjusting movement between the lower edge of the skirt and the points of contact of the wheels to provide a lower skirt position wherein air is drawn under the lower skirt edge and an upper skirt position for conducting normal grass cutting operations.

4. The mower of claim 3 wherein the adjusting means comprises means adjustably mounting the skirt on the frame.

5. The mower of claim 3 wherein the adjusting means comprises means for adjusting the wheels relative to the frame.

6. The mower of claim 1 wherein the mounting means comprises a plurality of separable fasteners each including a first component fixed to the frame and a second mating component fixed to the skirt.

* * * * *